United States Patent [19]

Oatis et al.

[11] 3,889,070

[45] June 10, 1975

[54] TONE DETECTING TELEPHONE CONNECTION MONITOR

[75] Inventors: Melvin Neal Oatis, Tustin; Henry V. McNulty, Corona Del Mar, both of Calif.

[73] Assignee: Telephonic Equipment Company, Santa Ana, Calif.

[22] Filed: June 4, 1973

[21] Appl. No.: 366,720

[52] U.S. Cl. .............................. 179/18 F; 179/84 R

[51] Int. Cl. ......................... H04b 3/46; H04m 1/00

[58] Field of Search ........... 179/18 F, 18 FA, 2.5 R, 179/18 FH, 84 R, 81 R, 175.2 C, 84 T, 175.3 R, 175, 84 VC; 340/147 F, 171 R

[56] References Cited

UNITED STATES PATENTS

| | | | |
|---|---|---|---|
| 3,450,844 | 6/1969 | MacDowell | 179/84 R |
| 3,475,561 | 10/1969 | Krasin et al. | 179/2.5 R |
| 3,603,740 | 9/1971 | Cambridge | 179/84 T |
| 3,766,336 | 10/1973 | Wikholm | 179/175.2 C |
| 3,773,986 | 11/1973 | Tremblay | 179/175.3 R |

*Primary Examiner*—Thomas A. Robinson

[57] ABSTRACT

The specification hereof discloses a tone signal monitor for purposes of supervising remote telephone connections which have been temporarily established and which are to be monitored and disconnected at a later time. The invention monitors a signal in the form of a specific tone which can be the timeout indicator tone that is generally utilized if after a short time the central office equipment or line finder has not been loaded such as when a disconnect has been made of a remote piece of connecting equipment. The tone detection is accomplished by a circuit having isolating means, a voltage supply, an intermediate amplifier compressor circuit to maintain the voltage output at a given level, and a phase locked loop circuit. The phase locked loop is connected to an amplifier for providing a signal which can operate and monitor suitable human warning means or a disconnect relay.

5 Claims, 1 Drawing Figure

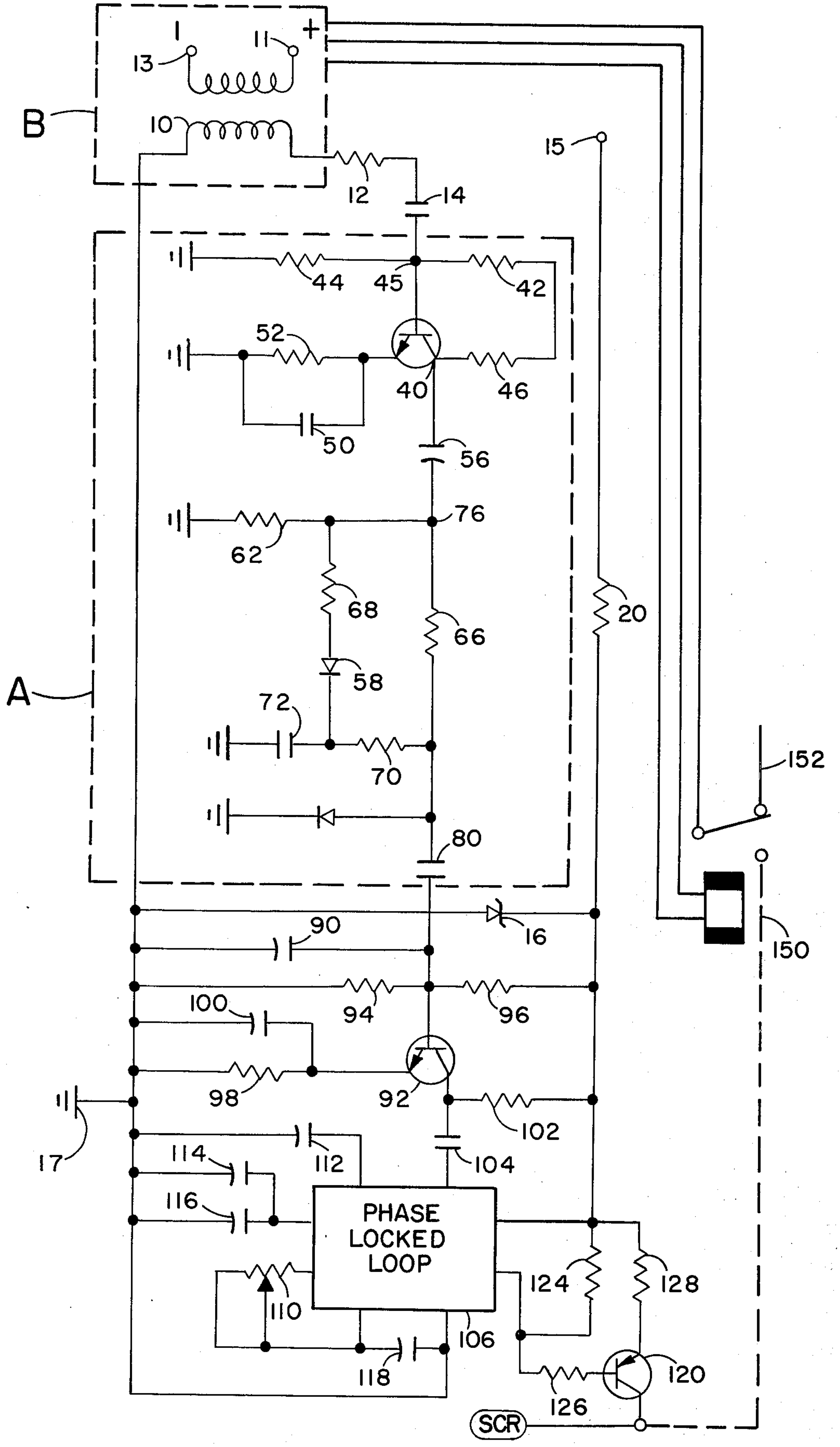
B
A
I
II
+
PHASE
LOCKED
LOOP
SCR
10
11
12
13
14
15
16
17
20
40
42
44
45
46
50
52
56
58
62
66
68
70
72
76
80
90
92
94
96
98
100
102
104
106
110
112
114
116
118
120
124
126
128
150
152

TONE DETECTING TELEPHONE CONNECTION MONITOR

BACKGROUND OF THE INVENTION

1. Field of the Invention

The field of this invention lies within the connection and disconnection monitoring art as it relates to telephone connections.

2. The Prior Art

The prior art of remote telephone connection apparatus comprises a number of devices wherein interconnects can be provided away from the central office. Specifically, lines from the central office are sometimes interconnected by remote switchboard, patching equipment, and various other temporary interconnections. Such connections are generally monitored for purposes of detecting when one of the parties hangs up.

In the past, the recognition of a voltage spike on the line has been utilized. The voltage spike principle is generally derived from closing a hook switch or other device wherein a spike is placed on the line. This voltage spike effectively can be amplified and monitored so as to operate a specific signal or disconnect apparatus. The signal apparatus enables one who is supervising the interconnection to make a disconnect after one of the parties that has been temporarily connected hangs up. If a connection is made with automatic equipment, the detection of the voltage spike can be utilized to automatically operate certain disconnection means in the form of relays.

Oftentimes, in secretarial lines, long distance lines, international lines and foreign exchanges, or on a subscriber carrier where there is no voltage spike, the amplitude of the voltage spike is limited. Thus, the foregoing spikes cannot be used to detect when the hook switch or other disconnection devices are closed. As a consequence, supervision of the connected lines to determine whether or not the lines have been disconnected must be effectuated by either human audio monitoring or other means.

In some cases, monitoring of a disconnect has been attempted by measuring the period of time from the dial tone to the timeout indicator tone. This measurement effectively provides information that the downstream relay switching apparatus at the main office has not been loaded. However, in such cases it is sometimes difficult to detect momentary opening. This is particularly true in a carrier situation, when there are other people on the same line, or when a subcarrier system is involved. It is also true when a person placing the call is controlling the central office functions by virtue of opening the line and maintaining it in an open position until the line is closed by hanging up the telephone.

As a consequence of the foregoing, it is necessary to detect when a connection has been disconnected with some suitable means. It has been found by the inventors that the use of the timeout indicator tone is an effective means.

Specifically, the timeout indicator tone is a tone which indicates that the lines are no longer loaded and that the specific time designated for loading the line has been met. This time can vary in duration up to a period of fiteen seconds before the tone detector is placed on the line and the connection to the central office equipment is expunged.

The inventors have found that by means of this circuit, the proper supervision and monitoring of a temporary connection can be effectuated. The circuit effectively takes a tone signal having a variable voltage and characterizes it as a usable signal for a phase locked loop detection of the specific frequency of the timeout indicator tone. The timeout indicator tone frequency as specified, can be related to the tuning of the circuit, so as to provide detection of a timeout indicator tone at various frequencies.

The entire circuit is provided with a given voltage through its own zener controlled power supply and has certain limiting features and isolation features which enables the phase locked loop detector to capture the timeout tone.

SUMMARY OF THE INVENTION

In summation, this invention comprises a means for detecting and supervising a temporary telephone connection which has been made and is subsequently terminated.

More specifically, the invention comprises a means for picking up a specific tone or frequency of oscillation on the line which indicates that the system is no longer being loaded and that a disconnection has been made of a previous connection. In other words, it can function to indicate that one of the callers has hung up after a connection has been made between them.

The specific tone is received in the form of a signal of approximately 490 herz and is picked up by a coil. The signal is then corrected with respect to its voltage variables by an amplifier compressor circuit to supply a signal of substantially constant voltage.

The invention then incorporates means for amplification, and a phase locked loop for receiving the signal and capturing it. The frequency of the capture capability as to the phase locked loop can be compensated for by a variable resistance.

After the signal has been detected and captured, a transistor or amplifier can function to operate a monitoring signal in the form of an audio or visual signal such as a respective buzzer or light. Also, a disconnect of the equipment being monitored can be made by the amplifier tripping a relay.

BRIEF DESCRIPTION OF THE DRAWINGS

The invention will be more clearly understood by reference to the description below taken in conjunction with the accompanying drawing wherein:

The drawing shows a schematic view of the circuitry of the telephone detector of this invention with the various components thereof.

DESCRIPTION OF THE PREFERRED EMBODIMENTS

Looking at the drawing, a coil is shown, such as the coil used in patching equipment. The coil 10 is often placed across the line in different forms of telephone connected equipment wherein the signal on the line can be picked up thereon. In other words, the coil 10 is merely a coil that can respond to various signals on the line.

The coil can be in a patching device or dial repeater known in the art for making temporary connections between two lines at a remote location from the central office. This type of device is generally shown by the dotted area labeled B and connected between the respective telephone lines. In other words, the circuit of this invention is primarily for monitoring when a temporary connection has been made between two telephone lines by the equipment in Block B.

A positive (tip) and negative (Ring) side 11 and 13 are respectively shown on the coil 10. The positive (tip) and negative (ring) sides are indicative of the telephone line across which this invention is to be placed. In addition thereto, a plus side 15 and a minus side 17, respectively positive and ground sources for operation of the circuit are shown.

The coil 10 picks up a sine wave across the coils which are in connected relationship at connection points 11 and 13. The coil 10 is basically a speech and tone detection type coil which can pick up the particular signal which the circuit is looking for. In this case, the tone detector circuit is looking for a 490 Herz signal which is the timeout indicator tone. As an aside, the timeout indicator tone indicates after a length of time that the central office equipment is not being utilized. In other words, the tone detector is basically looking for a particular frequency rather than a tone that indicates the foregoing.

A resistor 12 is provided which has the function of a limiting resistor. Also, a capacitor 14 is interposed to serve the function of DC isolation.

A zener diode 16 is shown across the circuit. The zener diode provides regulation within a 12 volt range for an integrated circuit which will be described. Also, it provides the proper voltage level for the other active components of the circuit.

A current limiting resistor 20 is shown leading from a positive power supply 15. The resistor 20 is utilized for limiting the power supplied at terminal 15 which is connected to a 24 volt DC power supply. The power can be provided by the patching network within the connecting module to be monitored, B, or it can be connected to any other power source providing an appropriate voltage.

The circuit generally shown within the dotted lines labeled A is utilized for maintaining a given voltage output when a variable voltage input is seen. In other words, the voltage which is seen at coil 10 can vary. However, it is preferable to have a constant voltage output to the remaining portion of the circuit. The circuit within the dotted lines A is generally an amplifier and compressor circuit which shall be expanded upon as to components and function.

Resistors 42 and 44 form a voltage divider at point 45 which serves to bias a transistor 40. Resistor 46 serves to maintain a voltage on transistor 40 at the collector thereof.

A capacitor 50 is provided across the resistor 52. The capacitor 50 is utilized to filter out the AC components so that there can be a constant biasing by resistor 52 on the transistor 40. The foregoing circuit of the resistor 52 and capacitor 50 enables the transistor 40 to operate in most ranges without being shut off by a positive AC signal seen thereon.

A second capacitor 56 blocks any DC and allows the conduction of an AC signal only to a rectifying diode 58.

A resistor 62 serves to maintain a discharge loop through the circuit provided by resistor 66. This serves to prevent reverse current flows from exceeding the desired amounts. Thus, the AC signal can be clipped by the diode 58 while at the same time providing blockage. A resistor 68 isolates the diode 58 and acts as a limiting resistor.

A resistor 70 is provided from the diode 58 to control the voltage output of the signal. In effect, it serves the function of controlling the current through the diode 58 and also the voltage with respect to a capacitor 72.

The capacitor 72 serves to operate in a manner whereby it shuts off a signal when it is seen at point 76. In other words, the greater the diode conducts, the more it shuts the signal out because of the character of the capacitor 72 and its inherent nature as well as the position that it is placed in.

A capacitor 80 is placed in the circuit at the terminal point of the area outlined by Block A. Capacitor 80 serves to block any DC signals so that it will transmit only the AC signal to the other portion of the circuit that is not outlined by Block A.

The foregoing completes the amplifier compressor circuit outlined by Block A which extends from point 45 to capacitor 80.

Another capacitor 90 in the remaining portion of the circuit is interposed to prevent the feedback of the signal from a transistor 92 which would affect the remainder of the circuit. However, the capacitor 90 in many cases could probably be eliminated due to the fact that there is a high impedance circuit after Block A in the remaining portion of the circuit which will prevent the passage of the feedback.

Resistors 94 and 96 serve to bias the transistor 92. The transistor 92 functions in a manner whereby it amplifies the signal which is received from the amplifier compressor circuit and in effect operates as an automatic gain control in the compressor circuit.

A resistor 98 functions to provide the proper voltage to the emitter of transistor 92. A capacitor 100 employed in parallel with the resistor 98 serves as a bypass capacitor to effectuate a constant bias on the transistor so that any AC components of the circuit will not degenerate the operation of transistor 92.

A resistor 102 provides a load for the collector of transistor 92. Thus, the signal across the transistor 92 is developed by the resistor 102.

A capacitor 104 isolates an integrated circuit 106 from direct current voltage and spurious currents. Thus, the integrated circuit 106 only receives particular signals which are to be examined as to whether they represent the "timeout indicating tone."

The circuit 106 is an integrated circuit of the type provided by many companies to function as a phase locked loop. The circuit generally comprises a voltage controlled oscillator of substantial stability and linearity, a phase detector of an amplifier, and a low pass filter. The center frequency of the phase locked loop is determined by the free running frequency of the voltage controlled oscillator. This frequency can be adjusted externally with a resistor or a capacitor. The low pass filter determines the capture characteristics of the loop which is formed by the resistor-capacitor.

Looking more specifically at the circuit 106, it is seen where the variable resistance is provided by resistor 110. Resistor 110, as previously alluded to, performs the function of providing a tuner for tuning the integrated circuit 106 to any particular tone or phase of a signal that is to be captured. Capacitors 112, 114, 116, and 118 are rolloff capacitors to allow a change of the band width of the unit so that you can lower or raise the capture frequency, depending upon the capacitor and its connection points.

A resistor 124 is provided for developing a voltage for the integrated circuit 106. A resistor 126 is utilized for the function of isolating the base of the transistor 120. Resistor 128 serves the function of properly biasing the emitter of transistor 120 so that it will function within the circuit.

It should be noted that capacitor 118 is part of the IC network of phase locked loop 106 and can be formed as part of the variable resistance within the IC package.

The variable resistance 110 and capacitor 118 enables a tuning of the IC 106 or phase locked loop within a specific frequency range, in other words, the phase locked loop capture frequency is established between the IC 106 and the variable resistance 110 as well as the external capacitors.

A transistor 120 is provided to change the logic level of the circuit and provide an inversion of the signal for use with an SCR. The SCR can be connected to the transistor 120 so that the signal from the output of the transistor at that point then gates the SCR to allow for a disconnection of the telephone line, or to provide a warning signal to a signaling means. Other suitable apparatus can be used to provide a signal after it has been received in the logic of phase locked loop 106. When an SCR is utilized for disconnecting the line, it should be turned on with a positive signal. Inasmuch as the output of the circuit 106 is negative, transistor 120 serves as an inverter function for gating the SCR. Also, the transistor 120 can take any suitable configuration and be substituted by any particular equivalent wherein an amplfication of the signal takes place or an inversion thereof for purposes of providing the proper triggering or disconnect by means of relays.

The output of transistor 120 can be connected to a relay 150 for disconnecting the temporary connection made through the patching unit labeled Block B. Also, the entire invention of the monitoring circuit can be placed in the patching network labeled Block B, which has been connected across telephone lines.

Operation of the Invention

In operation, the circuit is hooked up to the terminals 11, 13 and 15 with an appropriate ground 17. The terminals 11 and 13 can be a pickup coil of a particular interconnecting circuit, such as a patching device. The signal to be monitored is the timeout indicator tone of 490 Herz to detect and supervise a disconnect of a previous temporary connection. The coil 10 then picks up the signal to be captured by the phase locked loop and connects it as to its AC components to point 45. Point 45 of course, allows the transistor 40 to be placed in a condition whereby it will amplify the signal in conformance with standard amplification art. The amplifier or transistor 40 can serve as a basic amplifier and can bring the signal to a certain level.

After the signal has been brought to a desired level by the transistor 40, it is compresed by the remaining portion of the circuit in Block A. Thus, Block A serves the function of being an amplifier compressor circuit. The reason for the amplification is to raise it to a certain level so that the compressor circuit will function on a consistent basis. The compressor circuit portion of Block A functions generally as a means for eliminating oscillations which might be formed in a clipped manner.

In other words, the compressor circuit provides for a substantially uniform voltage regardless of the input voltage at point 45 which has been amplified by transistor 40. This enables the phase locked loop network within the integrated circuit 106 to always function in an appropriately biased manner without functioning spuriously by oscillations received thereat.

The output of the integrated circuit 106 upon capture of the timeout indicator tone is amplified as previously stated, by transistor 92 for effective usage by the phase locked loop of the integrated circuit 106.

The integrated circuit 106 is substantially a phase locked loop as previously described, and can be tuned within a certain range by a variable resistance 110. This enables it to capture certain frequency ranges. In this particular instance, the timeout tone is to be captured and is at approximately 490 Herz. Thus, the phase locked loop is tuned to approximately 490 Herz to pick up the timeout tone.

Of course, after the timeout indicator tone has been picked up by the invention, the transistor 120 amplifies the monitoring function to issue a signal which can trigger a disconnect means such as a relay in the device which performed the original temporary connection. It can also trigger a monitoring means such as a light or audio signal.

In summation, this invention provides a combination of a phase locked loop with a compressor and amplifier circuit, along with other components to effectuate a monitoring or disconnection of a temporary telephone connection which has been made by a telephone patching device.

Thus, it can be seen from the foregoing specification, that this invention can be used for disconnecting various connections or monitoring them. The basic idea is to monitor a particular frequency which is the timeout indicator tone and then either cause a disconnect or a supervisory signal to be issued. Thus, this invention is to be read in that light, as described by the following claims and is not to be limited by the foregoing specification.

We claim:

1. The new and novel combination comprising:

a telephone temporary connection means for connecting at least two telephone lines at a remote location from the central office;

monitor means associated with said connection means for detecting a tone having the frequency of the timeout indicator tone developed at the central office;

a frequency sensitive means connected to the output of said monitor means for responding to said timeout indicator tone wherein an output signal can be provided when said frequency sensitive means senses the timeout indicator tone; and, a warming device which is responsive to the output signal of said frequency sensitive means for apprising an operator of said connection apparatus of a terminated usage of the connected lines.

2. The combination as claimed in claim 1 further comprising:

a lamp connected to said frequency sensitive means for providing a visual signal upon sensing the timeout indicator tone.

3. The combination as claimed in claim 1 further comprising:

an electrical audio signal means connected to said frequency sensitive means for providing an audio signal upon sensing the timeout indicator tone.

4. The new and novel combination comprising:

a telephone temporary connection means for connecting at least two telephone lines at a remote location from the central office;

monitor means associated with said connection means for detecting a tone having the frequency of the timeout indicator tone developed at the central office;

a frequency sensitive means connected to the output of said monitor means for responding to said timeout indicator tone wherein an output signal can be provided when said frequency sensitive means senses the timeout indicator tone; and, an electrical disconnect means connected to the output of said frequency sensitive means for disconnecting the telephone lines that have been connected by said telephone temporary connection means.

5. The combination as claimed in claim 4 wherein said electrical disconnect means comprises:

a relay; and, wherein the output of said frequency sensitive means is connected to a transistor which serves to provide a signal to said relay for disconnecting the lines which have been previously temporarily connected.

* * * * *